United States Patent
Ohsawa (10) Patent No.: US 8,823,288 B2
(45) Date of Patent: Sep. 2, 2014

(54) DISCHARGE LAMP BALLAST APPARATUS

(75) Inventor: Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 877 days.

(21) Appl. No.: 12/999,043

(22) PCT Filed: Jul. 8, 2009

(86) PCT No.: PCT/JP2009/003189
§ 371 (c)(1),
(2), (4) Date: Dec. 14, 2010

(87) PCT Pub. No.: WO2010/023805
PCT Pub. Date: Mar. 4, 2010

(65) Prior Publication Data
US 2011/0089848 A1    Apr. 21, 2011

(30) Foreign Application Priority Data
Aug. 26, 2008  (JP) .................. 2008-216830

(51) Int. Cl.
*G05F 1/00*    (2006.01)
(52) U.S. Cl.
USPC ......... 315/308; 315/307; 315/291; 315/209 R
(58) Field of Classification Search
USPC ............ 315/82, 177, 200 R, 209 R, 219, 224, 315/225, 226, 276, 287, 291, 297, 299, 307, 315/308, 326, 361, 362
See application file for complete search history.

(56) References Cited

U.S. PATENT DOCUMENTS

| | | | |
|---|---|---|---|
| 5,351,182 A | 9/1994 | Miyazaki et al. | |
| 6,392,364 B1 | 5/2002 | Yamamoto et al. | |

FOREIGN PATENT DOCUMENTS

| | | | |
|---|---|---|---|
| JP | 6-153533 A | 5/1994 | |
| JP | 2000-166258 A | 6/2000 | |
| JP | 2001-43986 A | 2/2001 | |
| JP | 2001-258268 A | 9/2001 | |
| JP | 2001-273984 A | 10/2001 | |
| JP | 2002-233166 A | 8/2002 | |
| JP | 2004-274866 A | 9/2004 | |
| JP | 2005-100829 A | 4/2005 | |
| JP | 2006-331951 A | 12/2006 | |

*Primary Examiner* — Douglas W Owens
*Assistant Examiner* — Jianzi Chen
(74) *Attorney, Agent, or Firm* — Birch, Stewart, Kolasch & Birch, LLP (57) ABSTRACT

A discharge lamp ballast apparatus includes an F/F 10 for maintaining the on or off operation of a high-side switching device Q1 of an inverter in synchronization with a rising edge and falling edge of a main signal, and a return unit 9 for generating a signal for returning, even if the output Q of the F/F is inverted owing an unforeseen situation, the output to the polarity to be output normally; and returns the output of the F/F 10 to the first polarity to be output normally using the return signal.

16 Claims, 8 Drawing Sheets

DISCHARGE LAMP BALLAST APPARATUS

TECHNICAL FIELD

The present invention relates to a discharge lamp ballast apparatus for controlling lighting of a discharge lamp.

BACKGROUND ART

Figure 8:
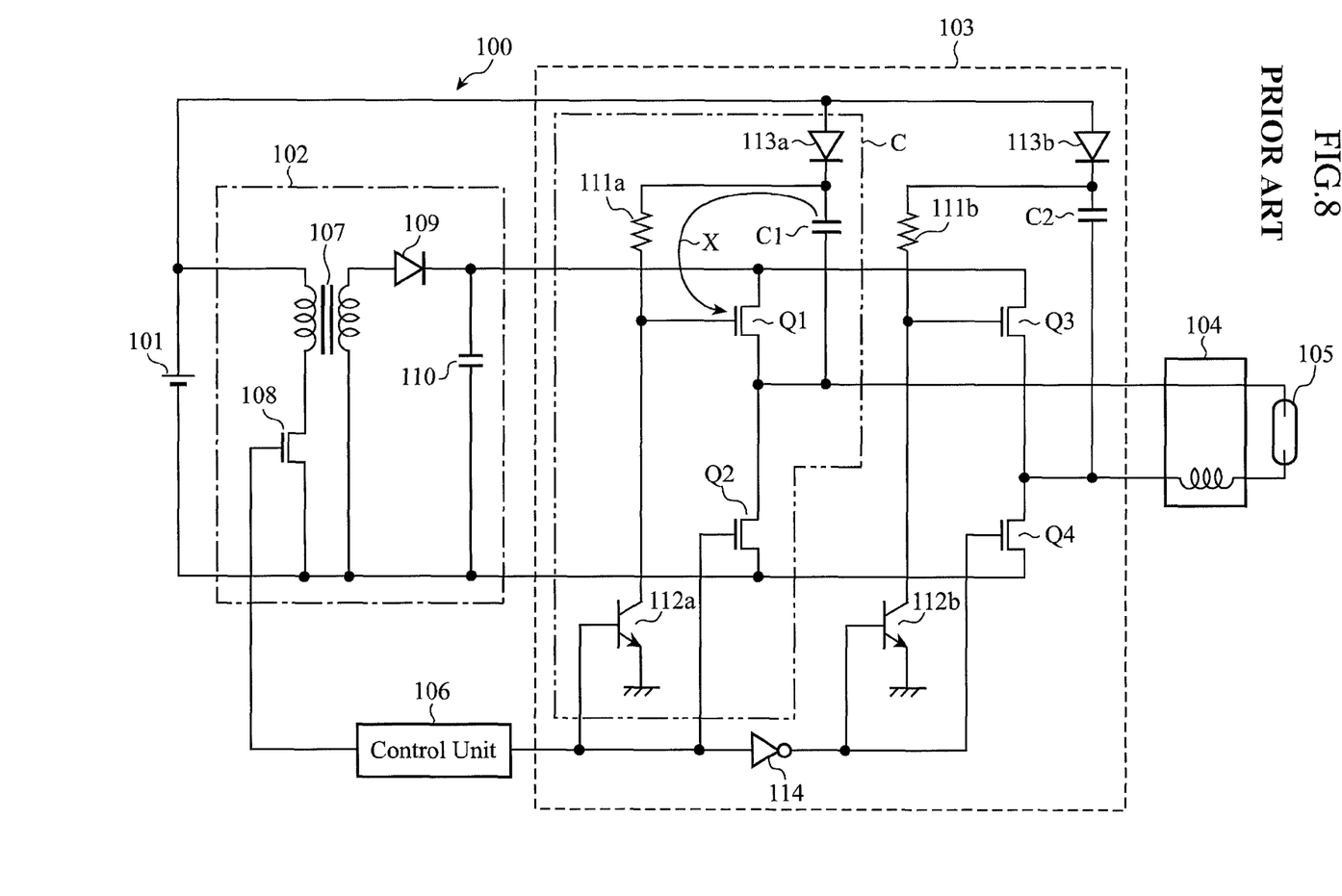
FIG. 8 is a circuit diagram showing a configuration of a conventional discharge lamp ballast apparatus.

FIG. 8 is a circuit diagram showing a basic configuration of a conventional discharge lamp ballast apparatus. In FIG. 8, the discharge lamp ballast apparatus 100 includes a DC/DC converter 102 for boosting the DC voltage of a DC power source 101, a DC/AC inverter 103 for converting the output voltage of the DC/DC converter 102 to a rectangular wave alternating current, an igniter 104 for starting discharge of an HID bulb (discharge lamp or high-intensity discharge lamp) 105, and a control unit 106 for controlling the DC/DC converter 102 and the DC/AC inverter 103.

The DC/DC converter 102 includes a flyback transformer 107, a switching device 108 consisting of a MOS field-effect transistor, a rectifying diode 109 and a smoothing capacitor 110. The DC/DC converter 102 applies the DC voltage of the DC power source 101 to the flyback transformer 107 by turning on the switching device 108 with the control unit 106, stores the magnetic energy in the flyback transformer 107, and generates the DC voltage by rectifying with the rectifying diode 109 the voltage generated in the flyback transformer 107 by releasing the magnetic energy stored in the flyback transformer 107 by turning off the switching device 108 with the control unit 106.

The DC/AC inverter 103 includes switching devices Q1-Q4 using MOS field-effect transistors or IGBTs, and an inverter driver. In FIG. 8, the switching devices Q1-Q4 are connected in an H fashion to constitute an H-bridge inverter. In this configuration, the switching devices Q1 and Q3 output high potential, and the switching devices Q2 and Q4 output low potential. Such an H-bridge inverter circuit is disclosed in Patent Document 1, for example.

In addition, the inverter driver employs a bootstrap circuit as an arrangement for driving the high-side switching device Q1 (Q3). The circuit has a resistor 111a and a capacitor C1 (or a resistor 111b and a capacitor C2) connected in series across the gate and source of the high-side switching device Q1 (Q3), a diode 113a (or 113b) for charging the capacitor C1 (C2) with the DC power source 101, and a driving transistor 112a (or 112b) having its collector connected to the gate of the switching device Q1 (Q3).

The driving transistors 112a and 112b consist of an NPN-type bipolar transistor, for example, and have their emitters grounded. In addition, the driving transistor 112a has its base connected to the control unit 106, and the driving transistor 112b has its base connected to the control unit 106 via a NOT circuit 114. Likewise, the low-side switching device Q2 has its gate connected to the control unit 106, and the switching device Q4 has its gate connected to the control unit 106 via the NOT circuit 114.

When the high-side switching device Q1 (Q3) is in the off state and the low-side switching device Q2 (Q4) connected in series to the switching device Q1 (Q3) is in the on state, the capacitor C1 (C2) is charged. When high-side switching device Q1 (Q3) changes to the on state, the charge stored in the capacitor C1 (C2) pulls up the gate voltage to a potential higher than the source terminal of the high-side switching device Q1 (Q3) by a value corresponding to the charge stored in the capacitor C1 (C2). This enables the gate voltage to hold its value because of the current flowing in the direction of the arrow X in FIG. 8, thereby being able to maintain the on state of the switching device Q1 (Q3). The DC/AC inverter 103 employing such a bootstrap circuit is disclosed in Patent Document 2, for example.

To start lighting of the HID bulb 105, the DC/AC inverter 103 keeps the on state of the high-side switching device and the low-side switching device paired in the H bridge in response to the control signal from the control unit 106, and keeps the off state of the high-side switching device and the low-side switching device opposite to them, thereby supplying a prescribed DC voltage to the HID bulb 105.

The igniter 104 superposes a high voltage pulse (igniter pulse) it generates upon the DC voltage and applies to the HID bulb 105. Thus, the HID bulb 105 brings about breakdown between its electrodes and starts the discharge. After applying the igniter pulse and starting the discharge, the DC/AC inverter 103 keeps the on state of the high-side switching device and the low-side switching device paired in the H bridge and the off state of the high-side switching device and the low-side switching device opposite to them until the discharge phenomenon of the HID bulb 105 becomes stable, and continues outputting the DC voltage.

Once the discharge has been stabilized, the DC/AC inverter 103 turns on and off the switching devices Q1 and Q4 and the switching devices Q2 and Q3 paired in the H bridge alternatively at a fixed repeat frequency (about 400 hertz, for example). Thus, the polarity of the DC voltage fed from the DC/DC converter 102 is reversed alternately to generate the rectangular wave alternating current. The rectangular wave alternating current is supplied to the HID bulb 105 via the igniter 104.

In addition, as a conventional inverter driver that reduces the current consumption of the capacitors C1 and C2 of the bootstrap DC/AC inverter described above, there is one employing an RS flip-flop (referred to as "F/F" from now on) (see Patent Document 3, for example). Incidentally, as an inverter driver IC using such an F/F, IR2110 of IR (International Rectifier) Corporation or the like is known.

Figure 9:
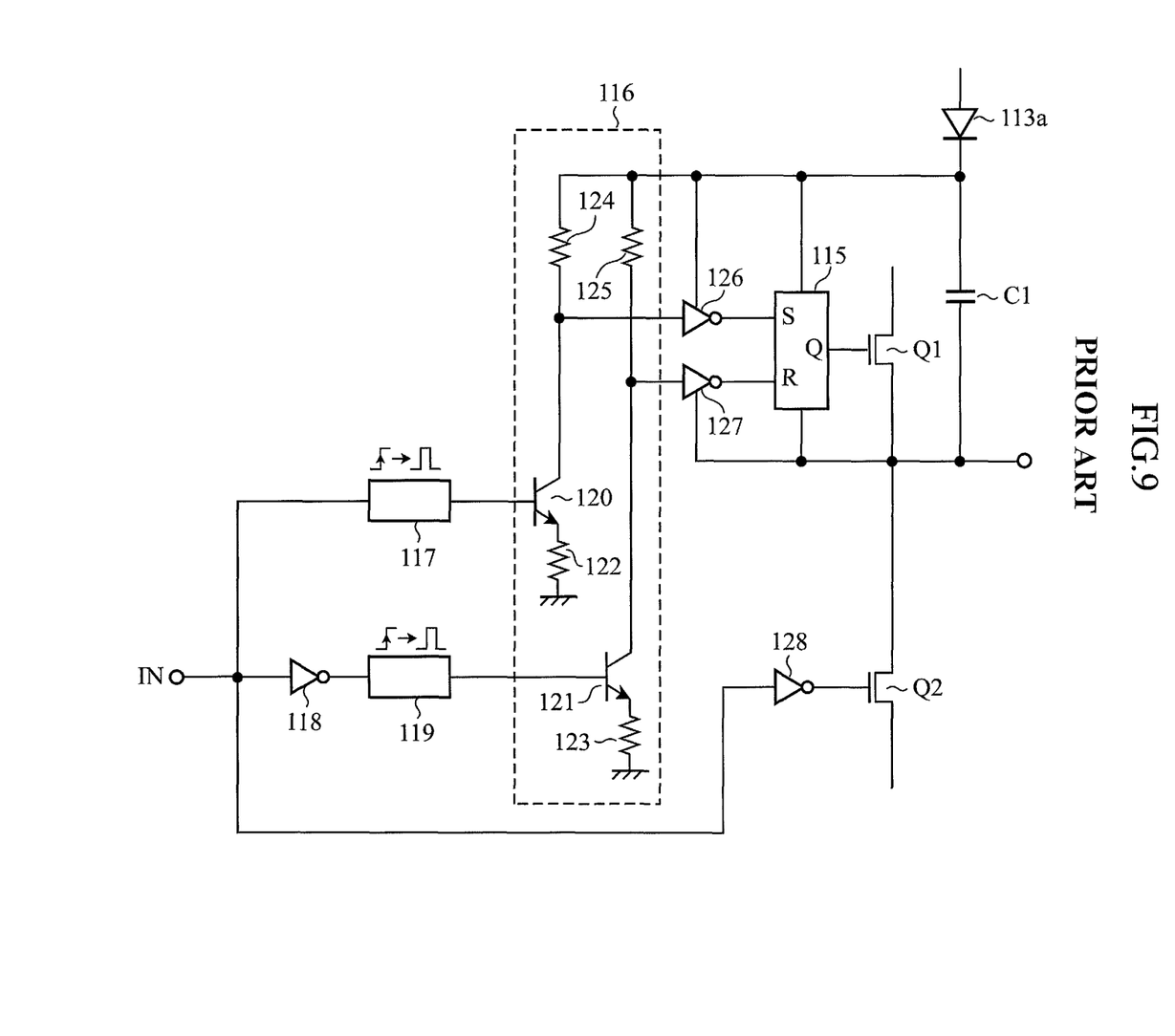
FIG. 9 is a circuit diagram showing a configuration of a major portion of an inverter driver using an F/F.

FIG. 9 is a circuit diagram showing a basic configuration of a major portion of an inverter driver using the F/F, which replaces the circuit section C in FIG. 8 for driving the high-side switching device Q1 (the switching device Q3 side is the same). In FIG. 9, the control signal from the control unit 106 is supplied to a pulse generator 117, and to a pulse generator 119 via a NOT circuit 118.

A level shift circuit 116 includes a transistor 120 for shifting the level of the pulse signal supplied from the generator 117 and a transistor 121 for shifting the level of the pulse signal supplied from pulse generator 119. The transistors 120 and 121 have their emitters grounded via resistors 122 and 123 and their collectors supplied with the charge stored in the capacitor C1 via resistors 124 and 125.

The F/F 115 has its output terminal Q connected to the gate of the high-side switching device Q1, its set terminal S connected to the set signal output of the level shift circuit 116 via a NOT circuit 126, and its reset terminal R connected to the reset signal output of the level shift circuit 116 via a NOT circuit 127.

The pulse generator 117 generates a pulse signal rising to a high level in synchronization with the rising edge of the control signal from the control unit 106, and supplies it to the transistor 120. During the high level of the pulse signal, the transistor 120 maintains itself at the on state and its collector potential at the low level, and keeps the input to the NOT circuit 126 at the low level and the output of the NOT circuit 126 at the high level.

Thus, being placed at the high level during a short time in synchronization with the rising edge of the control signal, the pulse current flows through the level shift circuit 116 on the side of the set terminal S, thereby setting the set terminal S of the F/F 115 at the high level. This will raise the output Q of the F/F 115 to the high level, and turns on the switching device Q1.

In short, the output Q of the F/F 115 rises to the high level in synchronization with the rising edge of the control signal and turns on the switching device Q1.

Incidentally, the pulse generators 117 and 119 are one-shot multivibrators for generating the pulse signals for a short time in synchronization with the rising edge the input signal.

On the other hand, the pulse generator 119, receiving the control signal from the control unit 106 via the NOT circuit 118, generates a pulse signal in synchronization with the rising edge of the signal, and supplies it to the transistor 121. During the high level of the pulse signal, the transistor 121 brings itself to the on state and its collector potential to the low level. Thus, the input to the NOT circuit 127 changes to the low level and the output of the NOT circuit 127 changes to the high level.

Accordingly, during a short time the pulse signal is placed at the high level, the pulse current flows through the level shift circuit 116 on side of the reset terminal R, thereby changing the potential at the reset terminal R of the F/F 115 to the high level. This will change the output Q of the F/F 115 to the low level, and turn off the switching device Q1.

In short, the output Q of the F/F 115 changes to the low level in synchronization with the falling edge of the control signal and turns off the switching device Q1.

In addition, the low-side switching device Q2 receives a rectangular wave resulting from inverting the control signal from the control unit 106 with the NOT circuit 128. This will cause the low-side switching device Q2 to perform operation opposite to that of the high-side switching device Q1, that is, it is in the off state while the switching device Q1 is in the on state.

Incidentally, the capacitor C1 is charged with the DC voltage of the DC power source 101 when the high-side switching device Q1 is in the off state and the low-side switching device Q2 connected to the low potential side of the switching device Q1 is in the on state.

In this manner, in the circuit shown in FIG. 9, a circuit current flows through the level shift circuit 116 only when the switching device Q1 (Q3) switches between its on and off states, and during the interval between them, the F/F 115 holds its output level. Thus, it can reduce the current consumption required for driving the high-side switching devices Q1 and Q3, thereby being able to simplify the circuit configuration around the power source of the DC/AC inverter 103.

PRIOR ART DOCUMENT

Patent Document

Patent Document 1: Japanese Patent Laid-Open No. 2001-43986.
Patent Document 2: Japanese Patent Laid-Open No. 2000-166258.
Patent Document 3: Japanese Patent Laid-Open No. 2004-274866.

DISCLOSURE OF THE INVENTION

In the discharge lamp ballast apparatus 100, however, the circuit block (igniter 104) that generates the high voltage pulse (igniter pulse) is placed close to the DC/AC inverter 103. Accordingly, in the inverter driver shown in FIG. 9, the output of the F/F 115 can be reversed because of a large surge or noise produced when the igniter 104 generates the high voltage pulse.

In this case, since the F/F 115 sets its output polarity in response to the pulse input to the set terminal S, it cannot change the output polarity by its own operation unless the input pulse is supplied again. Accordingly, if the output of the F/F 115 suffers an unexpected inversion during the lighting operation of the HID bulb 105, the output polarity is maintained and hence the DC/AC inverter 103 cannot return to its normal operation. This presents a problem in that the HID bulb 105 sometimes cannot be started.

In view of this, a method is conceivable of preventing the unexpected output inversion of the F/F 115 by using components capable of absorbing the large surge or noise or by placing the DC/AC inverter 103 away from the circuit block such as the igniter 104 and the like. However, considering variables propagating owing to variations in placement of the components including wiring and owing to difference in component characteristics, it is impossible to completely circumvent the abnormal operation of the DC/AC inverter 103 due to the output polarity inversion of the F/F.

The present invention is implemented to solve the foregoing problem. Therefore it is an object of the present invention to provide a discharge lamp ballast apparatus capable of returning from abnormal operation to normal operation appropriately, which abnormal operation results from the unexpected output inversion in a bistable circuit such as an F/F used for driving the switching devices.

A discharge lamp ballast apparatus in accordance with the present invention comprises: a converter for boosting input voltage from a DC power source for outputting DC voltage; an H-bridge inverter for switching, by on/off control of switching devices, polarity of input voltage from the converter to convert it to rectangular wave AC voltage to be supplied to a discharge lamp; a control unit for carrying out on/off control of the switching devices of the converter and the H-bridge inverter; and an inverter driver circuit for on/off driving the switching devices of the H-bridge inverter in response to a control signal from the control unit. The inverter driver circuit employs a bootstrap circuit having a bootstrap capacitor that is charged at off driving of a high potential side switching device and that serves as a driving power source at on driving thereof, and includes a bistable circuit for setting output polarity in synchronization with polarity inversion timing of the control signal, and for carrying out, in response to the output signal maintained at the polarity corresponding to the input signal, on/off driving of the high potential side switching device of the H-bridge inverter. The discharge lamp ballast apparatus further includes a return unit for returning the output of the bistable circuit to the polarity to be output normally by generating the return signal to the inverter driver circuit. Thus, it has the return unit to return the output of the switching devices of the inverter to the polarity to be output normally by returning the output of the bistable circuit to the polarity to be output normally by setting the output of the bistable circuit again by generating the return signal to the bistable circuit for holding the on/off operation of the high potential side switching device.

According to the present invention, even if the output inversion occurs in the bistable circuit owing to an unforeseen situation and thus abnormal operation of the switching devices results from that, it returns the output signal of the bistable circuit to the polarity to be output normally by setting the output of the bistable circuit again by the return signal.

Accordingly, it offers an advantage of being able to return the discharge lamp ballast apparatus to the normal operation appropriately.

BEST MODE FOR CARRYING OUT THE INVENTION

The best mode for carrying out the invention will now be described with reference to the accompanying drawings to explain the present invention in more detail.

Embodiment 1

Figure 1:
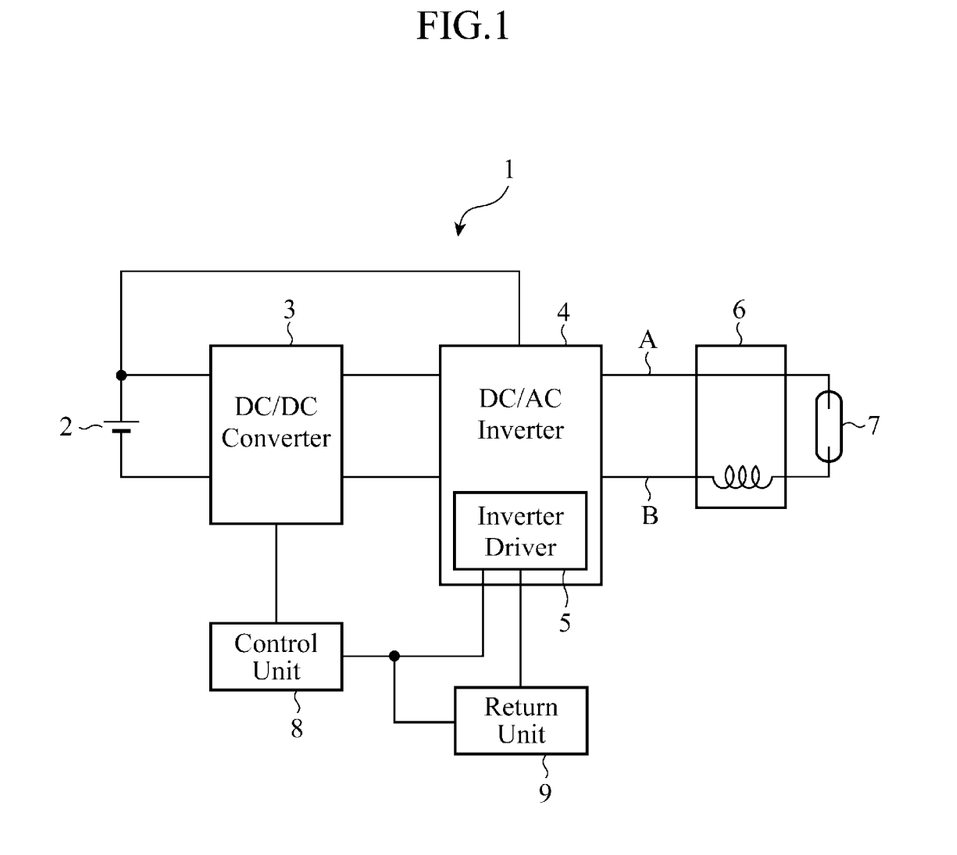
FIG. 1 is a diagram showing a configuration of a discharge lamp ballast apparatus of an embodiment 1 in accordance with the present invention.

FIG. 1 is a diagram showing a configuration of a discharge lamp ballast apparatus of an embodiment 1 in accordance with the present invention. In FIG. 1, the discharge lamp ballast apparatus 1 has a DC/DC converter (converter) 3 for boosting the DC voltage from a DC power source 2, a DC/AC inverter (inverter) 4 for converting the output voltage of the DC/DC converter 3 to a rectangular wave alternating current, an inverter driver (inverter driver circuit) 5 for driving the DC/AC inverter 4, an igniter 6 for starting discharge of an HID bulb 7, a control unit 8 for controlling the DC/DC converter 3 and DC/AC inverter 4, and a return unit 9 for returning the output of an RS flip-flop in the inverter driver 5.

The DC/DC converter 3, which has the same configuration as that of FIG. 8, comprises a flyback transformer, a switching device consisting of a MOS field-effect transistor, a rectifying diode and a smoothing capacitor. The DC/DC converter 3 stores the flyback transformer magnetic energy under the switching control of the switching device by the control unit 8, and generates the DC voltage by rectifying through the rectifying diode the voltage produced by the flyback transformer by releasing the stored energy.

The DC/AC inverter 4 includes switching devices Q1-Q4 employing MOS field-effect transistors and the inverter driver 5 as its counterpart of FIG. 8. In the DC/AC inverter 4, the switching devices Q1-Q4 are connected in an H fashion to construct an H-bridge inverter. Incidentally, in this configuration, the switching devices Q1 and Q3 output high potential and the switching devices Q2 and Q4 output low potential.

The inverter driver 5 has a configuration employing RS flip-flops as a circuit for driving the high-side switching devices Q1 and Q3 in the same manner as in FIG. 9. In addition, it has a return unit 9 on the input side of the level shift circuit. Its detailed configuration will be described later with reference to FIG. 2.

The igniter 6 generates a high voltage starting pulse (igniter pulse), superposes the generated high voltage pulse upon the output voltage of the DC/AC inverter 4, and applies to the HID bulb 7. Being supplied with the igniter pulse, the HID bulb 7 starts the discharge owing to the breakdown of the gas filled inside the bulb.

The control unit 8 controls the operation of the DC/DC converter 3 and DC/AC inverter 4. The control unit 8 can be implemented as a concrete means in which software and hardware cooperate on a microcomputer by causing a CPU of the microcomputer to execute a control program in accordance with the purpose of the present invention, for example.

The return unit 9 generates a return signal for returning to the normal operation the abnormal operation of the DC/AC inverter 4, which is due to the inversion of the output of the RS flip-flop of the inverter driver 5 owing to an unforeseen situation. Its detailed configuration will be described with reference to FIG. 2.

Figure 2:
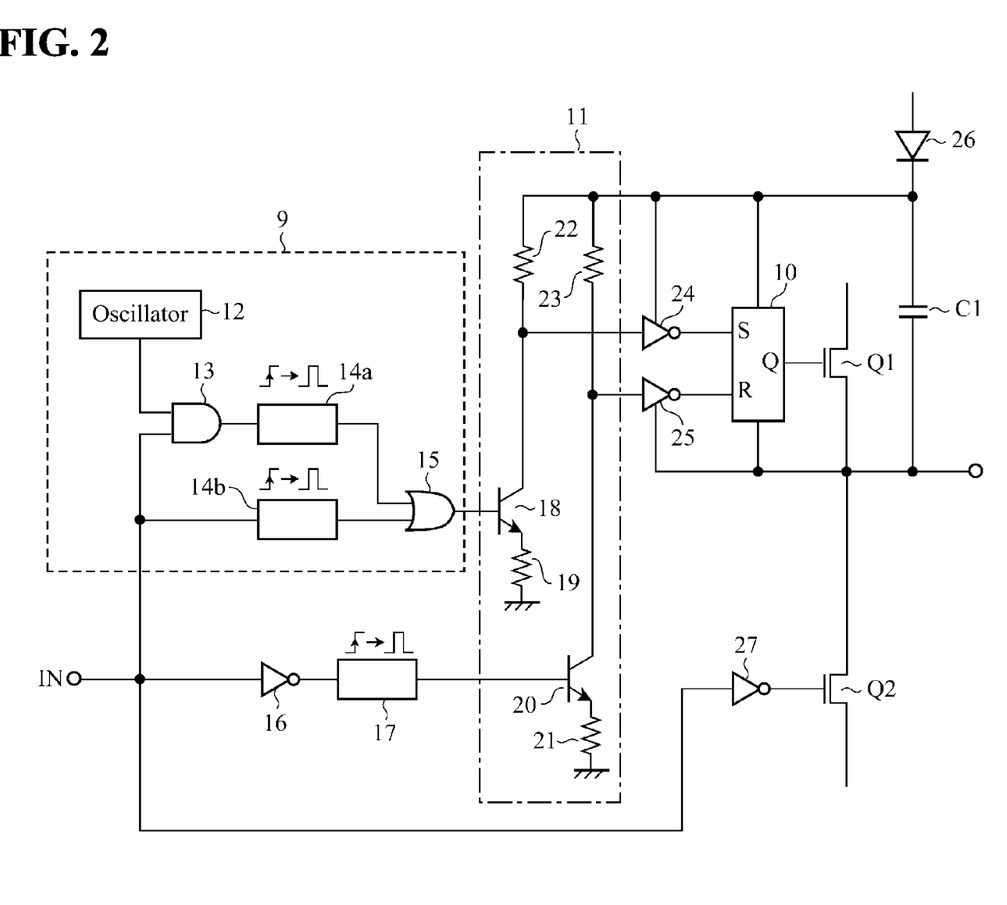
FIG. 2 is a circuit diagram showing a configuration of a half bridge section of the inverter driver and a return unit in FIG. 1.

FIG. 2 is a circuit diagram showing a configuration of a half bridge section on one side of the DC/AC inverter 4 and the return unit in FIG. 1. Although FIG. 2 shows a circuit section of the inverter driver 5 for driving the half bridge section configured by the switching devices Q1 and Q2, the other half bridge circuit side for driving the switching devices Q3 and Q4 is configured in the same manner.

In FIG. 2, the circuit for driving the switching device Q1 in the inverter driver 5 has an RS flip-flop (bistable circuit) (denoted by "F/F" from now on) 10 placed between the switching device Q1 and the level shift circuit 11 in the same manner as in FIG. 9. In addition, to the circuit section for driving the high-side switching device Q1, a bootstrap circuit is connected.

The return unit 9, which is provided on an input side of the level shift circuit 11 connected to the set terminal S of the F/F 10, has an oscillator 12, an AND circuit 13, pulse generators 14a and 14b, and an OR circuit 15. The oscillator 12 generates a periodic rectangular wave. The AND circuit 13 receives the output of the oscillator 12 and the control signal from the control unit 8 via an input terminal IN, and supplies the rectangular wave of their logical product to the pulse generator 14a.

The pulse generator 14a generates a pulse signal rising to a high level in synchronization with the rising edge of the rectangular wave of the logical product supplied from the AND circuit 13. The pulse generator 14b generates a narrow-width pulse signal in synchronization with the rising edge of the control signal received from the control unit 8 via the input terminal IN. The OR circuit 15 produces a logical sum of the outputs of the pulse generators 14a and 14b, and supplies it to the base of a transistor 18 of the level shift circuit 11.

The pulse generator 17 receives the control signal from the control unit 8 via the NOT circuit 16, and generates a narrow-width pulse signal in synchronization with the rising edge of the input signal. The pulse signal generated by the pulse generator 17 is supplied to the base of a transistor 20 of the level shift circuit 11.

The driving circuit of the low-side switching device Q2, which is constructed by connecting the gate of the switching device Q2 and the input terminal IN via a NOT circuit 27, carries out polarity inversion of the control signal from the control unit 8 through the NOT circuit 27, and supplies to the gate of the switching device Q2.

The level shift circuit 11 includes the transistor 18 for shifting the level of the output of the OR circuit 15 and the transistor 20 for shifting the level of the output of the pulse generator 17. The transistors 18 and 20 consist of an NPN-type bipolar transistor each, for example, have their emitter grounded via resistors 19 and 21, and their collectors supplied with the charge stored in the capacitor C1 (bootstrap capacitor) via resistors 22 and 23.

The F/F 10 sets and holds the output signal Q at the high level in response to the input to the set terminal S and at the low level in response to the input to the reset terminal R. The F/F 10 has its output terminal Q connected to the gate of the high-side switching device Q1, its set terminal S connected to the set signal output of the level shift circuit 11 via the NOT circuit 24, and its reset terminal R connected to the reset signal output of the level shift circuit 11 via the NOT circuit 25.

Next, the operation will be described.

To supply the HID bulb 7 with an alternating current, the control unit 8 generates the control signal for controlling the switching devices in the DC/AC inverter 4, detects the output current of the DC/DC converter 3 as the lamp current of the HID bulb 7 and the output voltage of the DC/DC converter 3 as the lamp voltage of the HID bulb 7, and controls lighting of the HID bulb 7 with the prescribed power in accordance with the detection values.

The DC/DC converter 3 stores the flyback transformer magnetic energy by carrying out switching control by supplying the switching device with the control signal from the control unit 8 as the gate signal, and generates the DC voltage by rectifying with the rectifying diode the voltage generated from the flyback transformer by releasing the energy stored.

The inverter driver 5 receives the control signal from the control unit 8 via the input terminal IN, and switches the output of the DC/AC inverter 4 in response to the high/low level of the control signal. In the present invention, the control signal for switching the output of the DC/AC inverter 4 (for generating the rectangular wave alternating current) for lighting the HID bulb normally as described above is defined as a "main signal". Thus, the DC/AC inverter control signal involved in the basic lighting operation is referred to as the main signal.

First, at the rising edge of the main signal produced from the control unit 8, the pulse generator 14b, receiving the main signal output from the control unit 8, generates a narrow-width high-level pulse signal in synchronization with the rising edge of the main signal, and supplies the narrow-width high-level pulse signal to the transistor 18 via the OR circuit 15. During the narrow-width high-level period of the pulse signal, the transistor 18 changes to the on state, lowers the collector potential, and causes a voltage drop across the resistor 22, thereby bringing the input to the NOT circuit 24 to the low level. This brings the output of the NOT circuit 24 to the high level and brings the set terminal S of the F/F 10 to the high level. This inverses the output of the F/F 10 and brings the output Q to the high level and the switching device Q1 to the on state.

Next, at the falling edge of the main signal produced from the control unit 8, the pulse generator 17, which receives the main signal output from the control unit 8 via the NOT circuit 16, generates a narrow-width high-level pulse signal in synchronization with the rising edge of the NOT circuit 16, that is, with the falling edge of the main signal, and supplies to the transistor 20. In the narrow-width high-level period of the pulse signal, the transistor 20 changes to the on state, reduces its collector potential, and generates a voltage drop across the resistor 23, thereby lowering the level of the input to the NOT circuit 25. In this case, the output of the NOT circuit 25 changes to the high level, and the reset terminal R of the F/F 10 changes to the high level. This will invert the output of the F/F 10 to change the output Q to the low level, thereby turning off the switching device Q1.

In addition, during the period in which the main signal output from the control unit 8 is kept high level, the AND circuit 13 outputs a rectangular wave equivalent to the rectangular wave oscillated from the oscillator 12 of the return unit 9, which oscillates the rectangular wave continuously. Then, the pulse generator 14a generates the pulse signal continuously, which is synchronized with the rising edge of the rectangular wave of the oscillator 12.

Accordingly, the OR circuit 15, which outputs the logical sum of the output of the pulse generator 14a and the output of the pulse generator 14b, outputs narrow-width pulses continuously, which is synchronized with the rising edge of the main signal and with the rising edge of the oscillator 12 while the main signal keeps the high level. In other words, during the high level of the main signal, the F/F 10 is supplied with the SET pulses repeatedly so that even if the output Q of the F/F 10 is inverted owing to an unforeseen situation and changes to the low level and the switching device Q1 is placed in the off state, the F/F 10 is supplied with the SET signal again at the rising timing of the repeatedly output rectangular wave of the oscillator 12. Thus the output Q of the F/F 10 is inverted and returned to the high level and the switching device Q1 is turned on. Accordingly, the HID bulb 7 can maintain its lighting state without continuing the abnormal operation of the DC/AC inverter 4.

The low-side switching device Q2 is supplied with the rectangular wave obtained by inverting the main signal from the control unit 8 via the NOT circuit 27. This will cause it to perform reverse operation to that of the high-side switching device Q1. Thus, when the switching device Q1 is in the on state, the switching device Q2 is placed in the off state.

Incidentally, the capacitor C1 is charged with the DC voltage of the DC power source 2 when the high-side switching device Q1 is in the off state and the low-side switching device Q2, which is connected to the low potential side of the switching device Q1, is in the on state.

Figure 3:
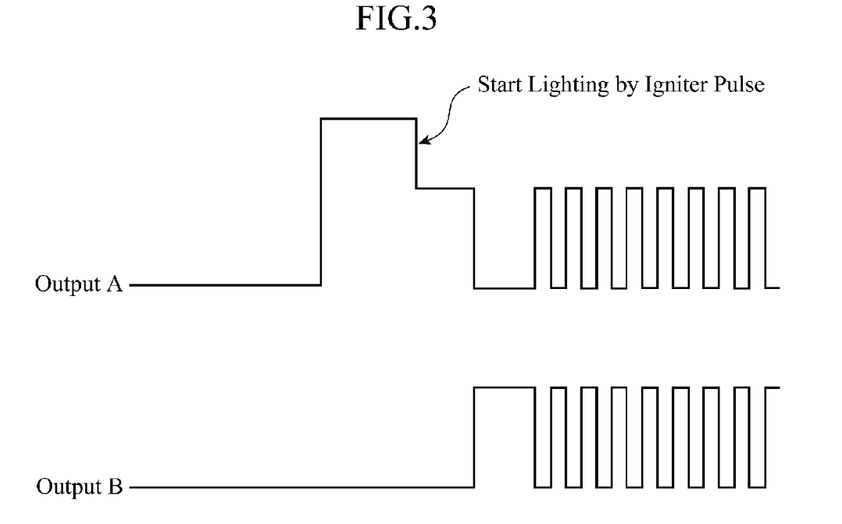
FIG. 3 is a diagram showing output voltage waveforms of a DC/AC inverter in lighting operation of the discharge lamp ballast apparatus of the embodiment 1.

FIG. 3 is a diagram showing output voltage waveforms of the DC/AC inverter 4 of the discharge lamp ballast apparatus when the HID bulb 7 is turned on normally without any abnormal operation of the F/F 10 in the discharge lamp ballast apparatus with the foregoing circuit configuration. The operation of the discharge lamp ballast apparatus will be described below with reference to FIG. 3. Incidentally, in FIG. 3, the output A is the voltage at the point of connection of the switching devices Q1 and Q2 of the DC/AC inverter 4, and the output B is the voltage at the point of connection of the switching devices Q3 and Q4 opposite to them.

Before starting lighting by bringing about a breakdown across the electrodes of the HID bulb 7, according to the main signal from the control unit 8, the DC/AC inverter 4 maintains the on state of the high-side switching device Q1 and the low-side switching device Q4 which form a pair in the H bridge and maintains the off state of the high-side switching device Q3 and the low-side switching device Q2 opposite to them, and supplies the HID bulb 7 with a DC voltage of about 400 (V), for example.

In other words, as for the output polarity at the start of lighting the HID bulb 7, a first output (output A in FIG. 3) is kept high potential and a second output (output B in FIG. 3) is kept low potential via the switching devices forming pairs in the H bridge.

The igniter 6 causes a breakdown across the electrodes of the HID bulb 7 and starts a discharge (lighting) by supplying the HID bulb 7 with superposition of a high voltage pulse (igniter pulse) it generates upon the DC voltage the DC/AC inverter 4 outputs. When the lighting starts owing to the breakdown across the electrodes of the HID bulb 7, followed by causing a current to flow, the output voltage of the DC/AC inverter 4 reduces to the start voltage of the HID bulb 7.

Until the discharge of the HID bulb 7 becomes stable after it is turned on by the igniter pulse supplied, the DC/AC inverter 4 carries out polarity switching operation with a period longer than the period of the alternating current rectangular wave (about 400 hertz, for example) in a normal ballast time period in response to the main signal from the control unit 8.

To output the alternating current rectangular wave with the normal ballast period, the control unit 8, selecting the timing at which the discharge becomes stable, switches alternately, in response to the normal ballast frequency (about 400 hertz, for example), between the combination of the on state of the high-side switching device Q1 and the low-side switching device Q4 which form a pair in the H bridge and the off state of the high-side switching device Q3 and the low-side switching device Q2 opposite to them and the combination opposite to the foregoing operation, that is, the combination of the off state of the high-side switching device Q1 and the low-side switching device Q4 which form the pair in the H bridge and the on state of the high-side switching device Q3 and the low-side switching device Q2 opposite to them, and outputs the switching result. The output converted to the alternating current rectangular wave by the DC/AC inverter 4 in response to the signal of the control unit 8 is supplied to the HID bulb 7 via the igniter 6 to light up the HID bulb 7.

Incidentally, although the oscillator 12 always oscillates the rectangular wave and supplies it to the AND circuit 13 regardless of an occurrence of the abnormal operation of the F/F 10, a configuration is also possible which oscillates it at prescribed timing such as during an output polarity fixed period before starting the discharge.

Figure 4:
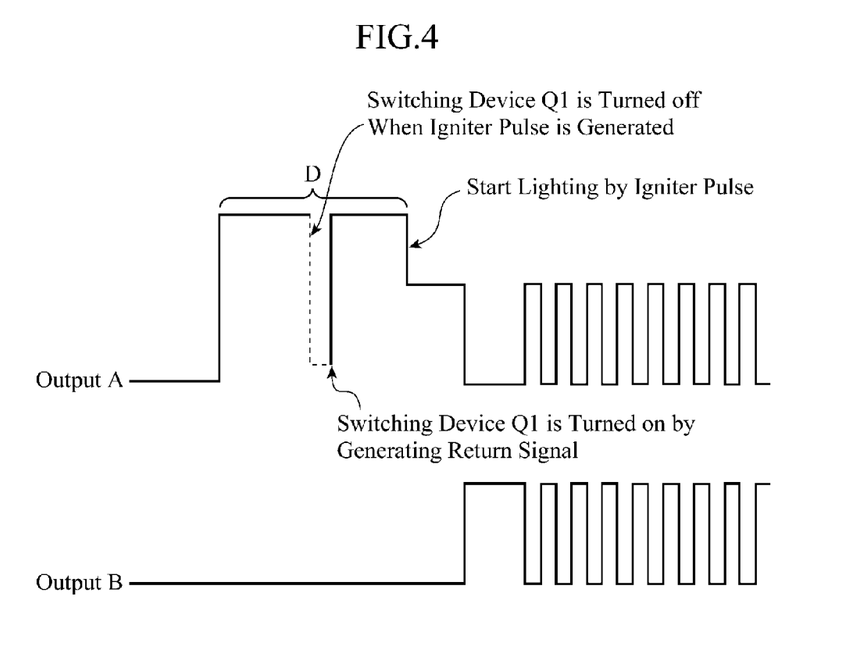
FIG. 4 is a diagram showing output voltage waveforms of the DC/AC inverter when the discharge lamp ballast apparatus of the embodiment 1 performs return processing during lighting operation.

FIG. 4 is a diagram showing the output voltage waveforms of the DC/AC inverter 4 when applying the return processing to the case where the output Q of the F/F 10 is inverted at the time when the igniter pulse is generated during the lighting operation of the discharge lamp ballast apparatus of the embodiment 1, in which the outputs A and B show the outputs via the switching devices which form pairs in the H bridge as in FIG. 3.

As described above, as for the outputs at the start of lighting the HID bulb 7 using the igniter pulse, the lighting operation is started by providing the output polarity fixed period D in which the output A is fixed at the high potential side and the output B is fixed at the low potential side.

In the output polarity fixed period D, if the output Q of the F/F 10 has polarity inversion and changes to the low level owing a surge or noise due to the generation of the igniter pulse, the switching device Q1 changes from the on state to the off state, and performs abnormal operation because the normal voltage is not output as shown by a broken line in FIG. 4.

As described above, if the output polarity makes an inversion and the switching device Q1 changes to the off state, the conventional discharge lamp ballast apparatus cannot return to the normal polarity because the rising edge is not supplied because the main signal is fixed at the high level.

In contrast with this, in the present embodiment 1, although the pulse generator 14b does not generate the pulse signal because the main signal is fixed at the high level during the output polarity fixed period D, the AND circuit 13 outputs the rectangular wave the oscillator 12 produces while the main signal is fixed at the high level. Thus, the pulse generator 14a supplies the OR circuit 15 with the return signal synchronized with the rising edge of the output signal of the AND circuit 13. Accordingly, the OR circuit 15 outputs the pulse signal synchronized with the rectangular wave generated by the oscillator 12 described above. The signal enables the switching device Q1 to change from the off state to the on state, that is, to the polarity to be output normally as described above.

As described above, according to the present embodiment 1, since it has the return unit 9, even if the inversion of the output Q of the F/F 10 occurs because of an unforeseen situation, it can return to the polarity to be output normally.

Embodiment 2

The foregoing embodiment 1 shows the case that utilizes the return signal based on the rectangular wave generated by the oscillator 12 which always oscillates regardless of the occurrence of the abnormal operation. In contrast, the present embodiment 2 monitors the operation of the DC/AC inverter 4, generates the return signal in response to the result of the monitoring, and returns the output of the F/F 10 to the polarity to be output normally.

Figure 5:
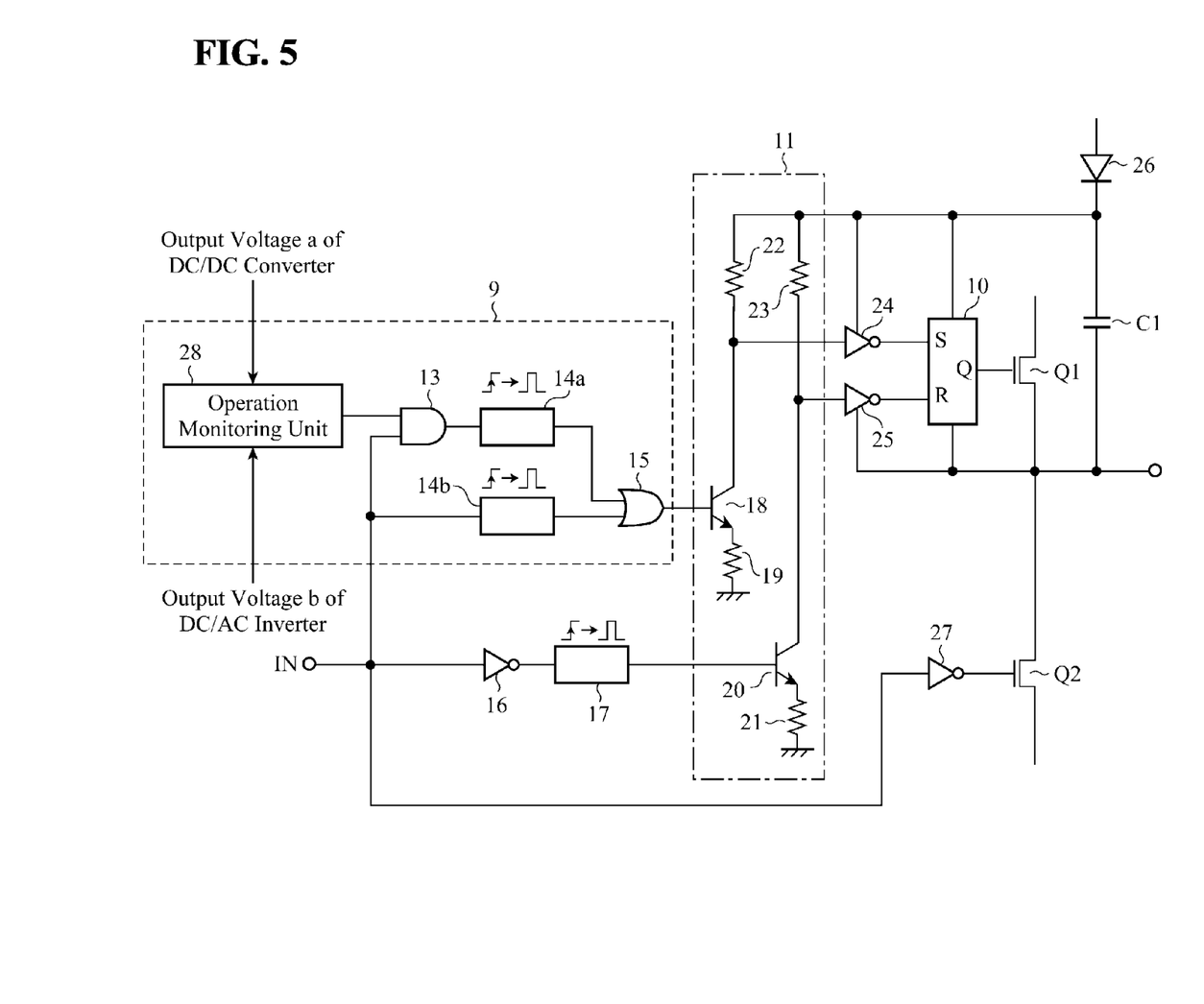
FIG. 5 is a circuit diagram showing a configuration of a half bridge section of the inverter driver and a return unit of a discharge lamp ballast apparatus of an embodiment 2 in accordance with the present invention.

FIG. 5 is a circuit diagram showing a configuration of a half bridge section of an inverter driver and a return unit of a discharge lamp ballast apparatus of the embodiment 2 in accordance with the present invention, in which the same or like components to those of FIG. 2 are designated by the same reference numerals and their description will be omitted here. In FIG. 5, an operation monitoring unit 28 decides the abnormal operation (as to whether the high-side switching device Q1 is in the off state or not during the output polarity fixed period, for example) from a result of comparing the output voltage a of the DC/DC converter 3 with the output voltage b of the DC/AC inverter 4, and supplies a rectangular wave to the AND circuit 13 when it makes a decision of the abnormal operation (that the high-side switching device Q1 is in the off state, for example).

Incidentally, since the control unit 8 detects the output voltage a and the output current c of the DC/DC converter 3, controls the lighting power by operating the DC/DC converter 3 in accordance with the detection result, and controls the switching operation of the DC/AC inverter 4, the operation monitoring unit 28 can be embodied by adding a detection function of the output voltage b anew. For example, the operation monitoring unit 28 can be realized as a concrete means in which software and hardware collaborate by installing a program module for functioning a microcomputer as the operation monitoring unit 28 in a control program for functioning the microcomputer as the control unit 8 and by causing the CPU of the microcomputer to execute the control program.

Next, the operation will be described.

As shown in FIG. 4 of the foregoing embodiment 1, if the high-side switching device Q1 turns off because the output Q of the F/F 10 is inverted owing to a surge or noise due to the igniter pulse generation during the output voltage polarity fixed period D, the output voltage b of the DC/AC inverter 4 reduces sharply as compared with the output voltage a of the DC/DC converter 3. Thus, the operation monitoring unit 28 of the present embodiment 2 detects this behavior from the result of comparing the output voltage b of the DC/AC inverter 4 with the output voltage a of the DC/DC converter 3, and makes a decision of the abnormal operation in which the high-side switching device Q1 is driven into the off state.

Making a decision of the abnormal operation, the operation monitoring unit 28 generates the rectangular wave at a prescribed period, and supplies it to the AND circuit 13. The AND circuit 13 outputs a signal synchronized with the rectangular wave from the operation monitoring unit 28, and the pulse generator 14a supplies the OR circuit 15 with the pulse signal synchronized with the rising edge of the output signal of the AND circuit 13. The operation thereafter is the same as that based on the oscillator 12 of the foregoing embodiment 1.

As described above, since the present embodiment 2 has the operation monitoring unit 28 that decides as to whether the high-side switching device Q1 (Q3) malfunctions owing to the inversion of the output Q of the F/F 10 or not from the result of comparing the output voltage of the DC/AC inverter 4 with that of the DC/DC converter 3 and generates the return signal when it makes a decision of the malfunction, even if the output Q of the F/F 10 carries out inversion due to an unforeseen situation, it can return it to the normal operation appropriately. In addition, carrying out the functions of the operation monitoring unit 28 with the program module in the control program for functioning the microcomputer as the control unit 8 enables the arithmetic processing of the CPU to generate the return signal. Accordingly, it is not necessary to install a dedicated circuit as the operation monitoring unit 28, which enables simplification of the circuit configuration.

Embodiment 3

Although the foregoing embodiments 1 and 2 show the configurations that generate and supply the return signal as an auxiliary signal separate from the main signal, the present embodiment 3 shows a case that gives the main signal the function of the return signal to carry out the return processing.

Figure 6:
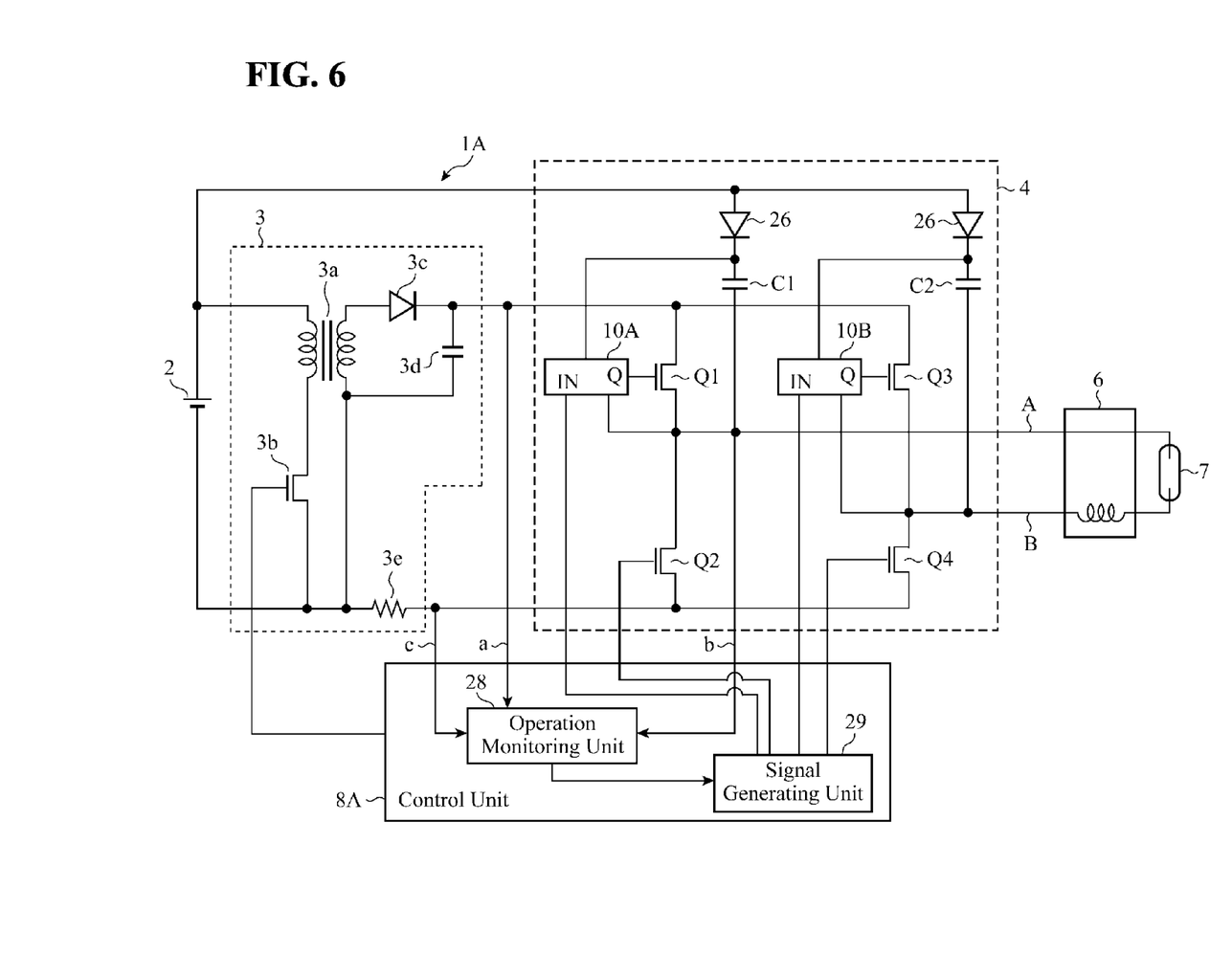
FIG. 6 is a diagram showing a configuration of a discharge lamp ballast apparatus of an embodiment 3 in accordance with the present invention.

FIG. 6 is a circuit diagram showing a configuration of a discharge lamp ballast apparatus of the embodiment 3 in accordance with the present invention. In FIG. 6, the discharge lamp ballast apparatus 1A of the embodiment 3 includes the DC/DC converter 3 for boosting the DC voltage of the DC power source 2, the DC/AC inverter 4 for converting the output voltage of the DC/DC converter 3 to a rectangular wave alternating current, the igniter 6 for causing the HID bulb 7 to start discharge, and a control unit 8A for controlling the DC/DC converter 3 and DC/AC inverter 4.

The DC/DC converter 3, like that in FIG. 8, comprises a flyback transformer 3a, a switching device 3b consisting of a MOS field-effect transistor, a rectifying diode 3c and a smoothing capacitor 3d. The DC/DC converter 3 stores magnetic energy in the flyback transformer 3a by applying DC voltage of the DC power source 2 to the flyback transformer 3a under the switching control of the switching device 3b with the control unit 8A, and generates the DC voltage by rectifying with the rectifying diode 3c the voltage produced in the flyback transformer 3a by releasing the magnetic energy stored in the flyback transformer 3a by turning off the switching device 3b with the control unit 8A. In addition, a current detecting resistor 3e, which is provided between the DC/DC converter 3 and the DC/AC inverter 4, can detect the lamp current c supplied to the HID bulb 7.

The DC/AC inverter 4 has switching devices Q1-Q4 using MOS field-effect transistors or IGBTs, for example, and an inverter driver 5. In FIG. 6, the switching devices Q1-Q4 are connected in H fashion to construct the H-bridge inverter. In this configuration, the switching devices Q1 and Q3 output high potential and the switching devices Q2 and Q4 output a low potential side. The configuration so far is the same as that of the foregoing embodiment 1 or 2. Incidentally, the driving circuit units 10A and 10B are a circuit comprising the F/F 10, NOT circuits 24 and 25 and level shift circuit 11 as shown in FIG. 2 or FIG. 5, for example.

In the present embodiment 3, the operation monitoring unit 28 and a signal generating unit 29 for generating the main signals corresponding to the switching devices Q1-Q4, respectively, are provided as a functional component of the control unit 8A. For example, the operation monitoring unit 28 and signal generating unit 29 can be realized as a concrete means in which the software and hardware collaborate by installing a program module for functioning a microcomputer as the operation monitoring unit 28 and signal generating unit 29 into the control program for functioning the microcomputer as the control unit 8A and by causing the CPU of the microcomputer to execute the control program.

The embodiment 3 with such a configuration excludes the AND circuit 13, pulse generators 14a, 14b and 17, NOT circuits 16 and 27 which are added to the inverter driver 5 for generating the main signal or for generating the return signal separately from it in the foregoing embodiment 1 or 2.

Many common inverter driver ICs on the market have only input terminals for the main signals. Accordingly, configuring the control unit 8A as described above and achieving the same function as the return signal with the main signals as will be described later, the present embodiment 3 can employ a common inverter driver IC without adding any new circuit to the driver IC.

Next, the operation will be described.

Figure 7:
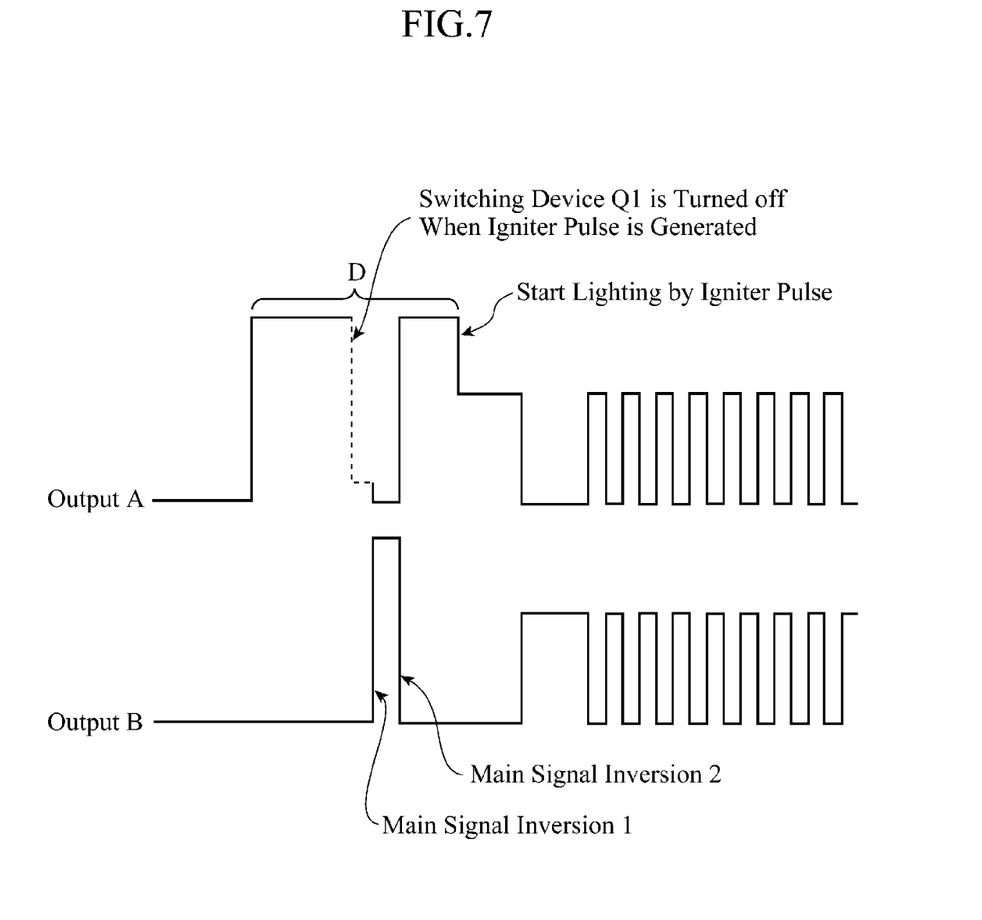
FIG. 7 is a diagram showing output voltage waveforms of the DC/AC inverter when the discharge lamp ballast apparatus of the embodiment 3 performs return processing during lighting operation.

FIG. 7 is a diagram showing the output voltage waveforms of the DC/AC inverter when applying the return processing to the case where the output Q of the F/F 10 is inverted at a time when the igniter pulse is generated during the lighting operation of the discharge lamp ballast apparatus of the embodiment 3.

In the output polarity fixed period D, if the output Q of the F/F 10 has polarity inversion and the high-side switching device Q1 turns off as shown by the broken line in FIG. 7, the output voltage b of the DC/AC inverter 4 reduces sharply as compared with the output voltage a of the DC/DC converter 3. Detecting this behavior from the result of comparing the output voltage b of the DC/AC inverter 4 with the output voltage a of the DC/DC converter 3, the operation monitoring unit 28 makes a decision of the abnormal operation in which the high-side switching device Q1 is driven into the off state.

To return the output Q of the F/F 10 to the normal state in the output polarity fixed period D, it is necessary to supply the set signal to the F/F 10.

Accordingly, if the operation monitoring unit 28 makes a decision of the abnormal operation, the signal generating unit 29 outputs the main signal for turning off the high-side switching device Q1 and for turning on the low-side switching device Q2, that is, the main signal (first control signal) for turning off the pair switching devices Q1 and Q4 of the DC/AC inverter 4 and for turning on the pair switching devices Q2 and Q3 (inversion 1 of the main signal), first.

After inverting the output polarity of the DC/AC inverter 4, the signal generating unit 29 outputs the main signal (second control signal) for turning on the pair switching devices Q1 and Q4 and for turning off the pair switching devices Q2 and Q3 (inversion 2 of the main signal) again, thereby being able to return the output of the DC/AC inverter 4 to the output polarity to be output normally as shown in FIG. 7.

As described above, in the present embodiment 3, the control unit 8A includes the operation monitoring unit 28 for making a decision as to whether the polarity of the output Q of the F/F 10 is inverted or not from the comparing result of the output voltage of the DC/AC inverter 4 with that of the DC/DC converter 3, and the signal generating unit 29 for returning, when the decision is made that the polarity of the output Q of the F/F 10 is inverted, the output Q of the F/F 10 to the polarity to be output normally by setting the output Q of the F/F 10 again by supplying the inverter driver 5 with the main signal (first control signal) for inverting the output polarity, and then with the main signal (second control signal) for inverting it again to the output polarity to be output normally. Thus, even if the output Q of the F/F 10 is inverted owing to an unforeseen situation and the abnormal operation occurs owing to that, the present embodiment 3 can set the polarity of the output Q of the F/F 10 again, thereby being able to return it appropriately to the polarity to be output normally.

In addition, it can employ a common inverter driver IC having only input terminals for the main signals without change by constructing the operation monitoring unit 28 and signal generating unit 29 as the functional components of the control unit 8A to achieve the same function as that of the return signal shown in the foregoing embodiment 1 or 2 with the main signals. Thus, it can carry out the return processing by the arithmetic processing of the CPU of the microcomputer that implements the control unit 8A, thereby being able to simplify the configuration of the apparatus.

Incidentally, although the foregoing embodiments 1-3 are described by way of example having configurations using the F/F 10 as the inverter driver 5, it is not limited to an RS flip-flop. As the F/F, for example, a circuit is enough which has a bistable output state for holding the on or off state of the high-side switching devices.

Although the foregoing embodiments 1-3 are described by way of example employing the H-type full-bridge inverter consisting of the four switching devices Q1-Q4, a half bridge type circuit configuration is also possible.

INDUSTRIAL APPLICABILITY

As for the discharge lamp ballast apparatus in accordance with the present invention, even if output inversion due to an unforeseen situation occurs in the bistable circuit and the abnormal operation of the switching devices occurs owing to that, it can set the output of the bistable circuit by the return signal again, and return the output signal of the bistable circuit to the polarity to be output normally. Thus, it has an advantage of being able to return the discharge lamp ballast apparatus to the normal operation appropriately. Accordingly, it is suitably applied to a discharge lamp ballast apparatus and the like for controlling lighting of a discharge lamp.

What is claimed is:
1. A discharge lamp ballast apparatus including:
a converter that boosts input voltage from a DC power source for outputting DC voltage;
an inverter that switches, by on/off control of switching devices, polarity of the voltage output from the converter to convert it to rectangular wave AC voltage to be supplied to a discharge lamp;
a controller that carries out on/off control of the switching devices of the converter and the inverter; and
an inverter driver that carries out on/off driving of the switching devices of the inverter in response to a control signal from the controller, the discharge lamp ballast apparatus employing in the inverter driver a bootstrap circuit having a bootstrap capacitor that is charged at off driving of a high potential side switching device of the inverter and that serves as a driving power source at on driving thereof,
the inverter driver comprising a bistable circuit that sets output polarity in synchronization with a rising/falling edge of the control signal, and holds, in response to the output maintained at the polarity corresponding to the control signal, on/off operation of the high potential side switching device of the inverter; and
the discharge lamp ballast apparatus further comprising a return unit that returns the output of the bistable circuit to the polarity to be output normally by setting the output of the bistable circuit again by supplying a return signal to the inverter driver prior to the next rising/falling edge of the control signal following the initial setting of the output polarity, wherein
the return unit returns the output of the switching devices of the inverter to the polarity to be output normally by setting on/off operation of the switching devices of the inverter again by generating the return signal to the inverter driver.

2. The discharge lamp ballast apparatus according to claim 1, wherein
the return unit supplies the inverter driver with the return signal at timing at which the output of the bistable circuit is set to prescribed polarity.

3. The discharge lamp ballast apparatus according to claim 2, wherein
in an output polarity fixed period during which the inverter driver fixes the output to be supplied from the inverter to the discharge lamp before starting discharge of the discharge lamp to one polarity for a long time as compared with a period at normal lighting, the return unit supplies the return signal to the inverter driver at an interval shorter than the output polarity fixed period.

4. The discharge lamp ballast apparatus according to claim 3, wherein the bistable circuit is an RS flip-flop.

5. The discharge lamp ballast apparatus according to claim 2, wherein the bistable circuit is an RS flip-flop.

6. The discharge lamp ballast apparatus according to claim 1, wherein
the return unit has an oscillator that generates a signal, and generates the return signal in response to the signal from the oscillator and the control signal.

7. The discharge lamp ballast apparatus according to claim 6, wherein the bistable circuit is an RS flip-flop.

8. The discharge lamp ballast apparatus according to claim 1, wherein
the return signal consists of a pair of a first control signal for inverting the output polarity of the bistable circuit and a second control signal for inverting the output polarity again to return to the output polarity to be output normally.

9. The discharge lamp ballast apparatus according to claim 8, wherein the bistable circuit is an RS flip-flop.

10. The discharge lamp ballast apparatus according to claim 1, wherein the bistable circuit is an RS flip-flop.

11. A discharge lamp ballast apparatus including:
a converter that boosts input voltage from a DC power source for outputting DC voltage;
an inverter that switches, by on/off control of switching devices, polarity of the voltage output from the converter to convert it to rectangular wave AC voltage to be supplied to a discharge lamp;
a controller that carries out on/off control of the switching devices of the converter and the inverter; and an inverter driver that carries out on/off driving of the switching devices of the inverter in response to a control signal from the controller, the discharge lamp ballast apparatus employing in the inverter driver a bootstrap circuit having a bootstrap capacitor that is charged at off driving of a high potential side switching device of the inverter and that serves as a driving power source at on driving thereof, the inverter driver comprising a bistable circuit that sets output polarity in synchronization with the control signal, and holds, in response to the output maintained at the polarity corresponding to the control signal, on/off operation of the high potential side switching device of the inverter; and the discharge lamp ballast apparatus further comprising a return unit that returns the output of the bistable circuit to the polarity to be output normally by setting the output of the bistable circuit again by supplying a return signal to the inverter driver, wherein the return unit returns the output of the switching devices of the inverter to the polarity to be output normally by setting on/off operation of the switching devices of the inverter again by generating the return signal to the inverter driver, and wherein the return unit:
  comprises an operation monitor that makes a decision as to whether the output of the bistable circuit causes abnormal inversion or not from a result of comparing the output voltage of the inverter with that of the converter, and generates a signal when making a decision of abnormal inversion; and
  generates the return signal in response to the signal from the operation monitor.

12. The discharge lamp ballast apparatus according to claim 11, wherein the bistable circuit is an RS flip-flop.

13. A discharge lamp ballast apparatus including:
a converter that boosts input voltage from a DC power source and outputs it;
an inverter that switches, by on/off control of switching devices, polarity of the output voltage from the converter to convert it to rectangular wave AC voltage to be supplied to a discharge lamp;
a controller that carries out on/off control of the switching devices of the converter and the inverter; and
an inverter driver that carries out on/off driving of the switching devices of the inverter in response to a control signal from the controller, the discharge lamp ballast apparatus employing in the inverter driver a bootstrap circuit having a bootstrap capacitor that is charged at off driving of a high potential side switching device of the inverter and that serves as a driving power source at on driving thereof, the inverter driver comprising a bistable circuit that sets output polarity in synchronization with the control signal, and holds, in response to the output maintained at the polarity corresponding to the control signal, on/off operation of a high potential side switching device of the inverter; and the controller comprising:
an operation monitor provided in the controller that makes a decision as to whether the output of the bistable circuit causes abnormal inversion or not from a result of comparing the output voltage of the inverter with that of the converter; and a signal generator that generates a control signal for returning, if a decision is made by the operation monitor that the output of the bistable circuit is inverted abnormally, the output of the bistable circuit to the polarity to be output normally by setting the output of the bistable circuit again by supplying the inverter driver with a first control signal for inverting the output of the bistable circuit with respect to the output polarity to be output normally, and subsequently by supplying the inverter driver with a second control signal for inverting the output of the bistable circuit again to the output polarity to be output normally, wherein the signal generator returns, when the operation of the bistable circuit is abnormal, the output of the switching devices of the inverter to the polarity to be output normally by setting the output of the switching devices of the inverter again by generating the first control signal and the second control signal.

14. The discharge lamp ballast apparatus according to claim 13, wherein
the inverter is an H-bridge circuit consisting of four switching devices, and converts the output voltage of the converter to the rectangular wave AC voltage by switching the polarity of the output voltage of the converter by carrying out alternate on/off control by dividing the four switching devices into two pairs; and
the signal generator returns, if a decision is made by the operation monitor that the output of the bistable circuit is inverted abnormally, the output of the bistable circuit to the polarity to be output normally by setting the output of the bistable circuit again by supplying the inverter driver with the first control signal for turning off each switching device of a first pair of the switching devices to be in an on state normally and for turning on each switching device of a second pair of the switching devices to be in an off state normally, and subsequently by supplying the inverter driver with the second control signal for turning on each switching device of the first pair of the switching devices to be in an on state normally and for turning off each switching device of the second pair of the switching devices to be in an off state normally.

15. The discharge lamp ballast apparatus according to claim 14, wherein the bistable circuit is an RS flip-flop.

16. The discharge lamp ballast apparatus according to claim 13, wherein the bistable circuit is an RS flip-flop.

* * * * *